United States Patent
Orton et al.

[11] 3,786,508
[45] Jan. 15, 1974

[54] HIGH SPEED ANGLE GATE
[75] Inventors: Criley Orton, Riverside; Allen D. Ehresman, Corona, both of Calif.
[73] Assignee: The United States of America as represented by the Secretary of the Navy, Washington, D.C.
[22] Filed: Sept. 9, 1969
[21] Appl. No.: 857,629

[52] U.S. Cl. ............... 343/7 A, 343/7.4, 343/16 M
[51] Int. Cl. ............................................. G01s 7/02
[58] Field of Search .................. 343/7 A, 7.4, 16 M

[56] References Cited
UNITED STATES PATENTS
2,942,258  6/1960  Priest .............................. 343/7.4 X Primary Examiner—T. H. Tubbesing
Attorney—R. S. Sciascia, G. J. Rubens and J. W. McLaren

[57] ABSTRACT

A high speed angle gate for preventing the passage of an accept pulse in a seeker system if the incoming directional information is from a target outside prescribed angular limits. Two different difference amplifiers produce negative outputs when the input signal exceeds a predetermined value. The negative signal then cancels the positive enabling pulse by adding the two signals.

3 Claims, 1 Drawing Figure

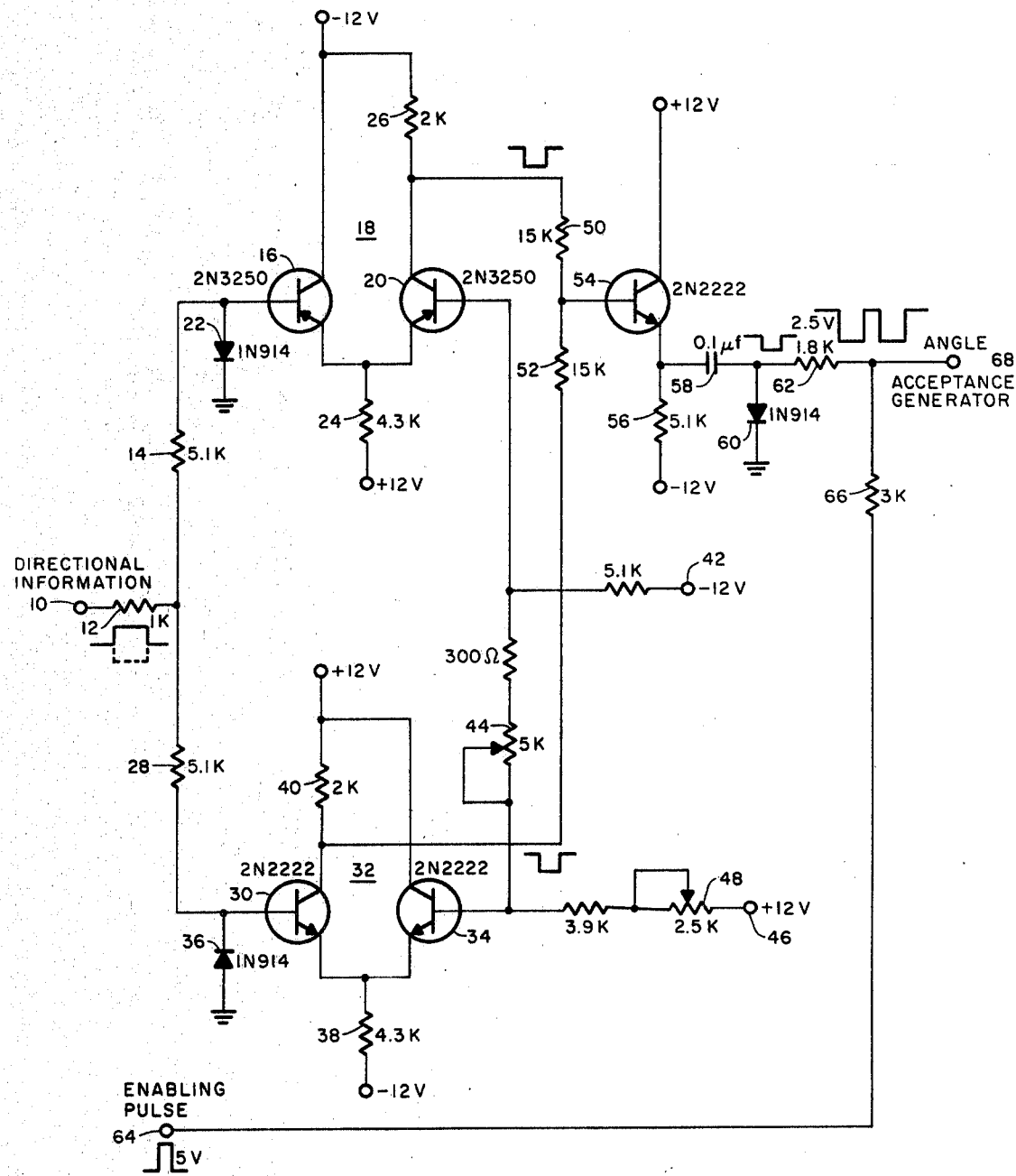

HIGH SPEED ANGLE GATE

The invention herein described may be manufactured and used by or for the Government of the United States of America for governmental purposes without the payment of any royalties thereon or therefor.

BACKGROUND OF THE INVENTION

1. Field of the Invention

The present invention relates to a high speed angle gate and more particularly to a high speed angle gate wherein a negative pulse is produced whenever the input amplitude (regardless of polarity exceeds the prescribed voltage limits,) exceeds a predetermined value.

2. Description of the Prior Art

Prior known system for high speed angle gating used numerous pulse transformers with their associated circuitry which was expensive and complicated.

SUMMARY OF THE INVENTION

The present invention provides a high speed gating device which prevents the passage of an accept pulse in a seeker system if the incoming directional information is from a target outside prescribed angular limits. The input signal is a bi-polar directional information pulse whose amplitude is a measure of the angular displacement of a target from a monopulse antenna boresight. By means of a difference amplifier arrangement, a negative pulse is produced whenever the input pulse amplitude (regardless of polarity) exceeds the voltage level corresponding to the prescribed angular limits. This negative pulse is used to cancel a positive enabling pulse trigger so that a positive output is generated only if the input signal amplitude is less than the set voltage. The gating function can be performed up to 200 kilohertz, over wide temperature ranges, and with low power consumption.

BRIEF DESCRIPTION OF THE DRAWING

Many of the attendant advantages of this invention will become readily appreciated as the same becomes better understood by reference to the following detailed description when considered in connection with the accompanying drawing wherein there is shown in a single FIGURE a schematic diagram of a preferred embodiment of the invention.

DESCRIPTION OF THE PREFERRED EMBODIMENT

Referring now to the drawing there is shown an input terminal 10 for receiving the directional information pulses. Input terminal 10 is connected through resistors 12 and 14 to the base of transistor 16 of a different amplifier 18 for negative input pulses. Difference amplifier 18 includes transistors 16 and 20, clipping diode 22, emitter resistor 24 and load resistor 26.

Input terminal 10 is also connected through resistors 12 and 28 to the base of transistor 30 of difference amplifier 32 for positive input pulses. Difference amplifier 32 includes transistors 30 and 34, clipping diode 36, emitter resistor 38 and load resistor 40. The negative bias for the base of transistor 20 is supplied at terminal 42 and the positive bias for the base of the transistor 34 is supplied at terminal 46. The difference between the positive bias at terminal 46 and the negative bias at terminal 42 is adjusted by variable resistor 44, and represents the variable angle which is being accepted. The positive and negative biases are normally symmetrical, but occasionally are required to be unbalanced. Variable resistor 48 provides the means.

Any output signal from difference amplifiers 18 and 32 are added in resistors 50 and 52 and applied to the base of transistors 54 which acts as an emitter follower. The signal across load resistor 56 is d-c decoupled by means of capacitor 58 and blocking diode 60 and added through resistor 62 to the enabling pulse applied at terminal 64 and fed through resistor 66. The output signal appears at terminal 68.

In operation and with the value assigned a positive input pulse at terminal 10 will be clipped at the base of transistor 16 but pulls the base of transistor 30 positive. When the base of transistor 30 becomes as positive as the base of transistor 34 then transistor 30 begins conducting emitter current and develops a negative-going output at its collector. The output voltage at the collector of transistor 30 drops from +12 to +6 volts during the time the positive pulse at terminal 10 is present. If the input pulse at terminal 10 had been negative it would be clipped at the base of transistor 30 but would cause a negative-going pulse to appear at the collector of transistor 20 in the same manner described for difference amplifier 32. The voltage at the collector of transistor 20 drops from −6 volts to −12 volts.

The negative-going pulses are added in resistors 50 and 52 to produce pulses that drop from +3 volts to 0 volts during the time the input pulse at terminal 10 exceeds the set limits of either polarity. The negative pulse appearing out of the emitter follower 54 is added to the 5 volt positive enabling trigger pulse at terminal 64. The presence of the negative pulse out of transistor 54 is dependent upon the amplitude of the input pulse at terminal 10 exceeding a threshold value as determined by the biases on transistors 20 and 34. The blocking or non-blocking of the enabling pulse applied at terminal 64 is then dependent upon the amplitude of the input informational pulse at terminal 10.

What is claimed is:

1. In a high speed angle gate circuit, the combination comprising:
   a. input terminal for receiving a bi-polar directional information pulse whose amplitude is a measure of angular displacement,
   b. difference amplifier means comprising first and second difference amplifier coupled to said input terminal for generating an output negative pulse regardless of the polarlity of the input pulse whenever the input pulse amplitude exceeds a predetermined amplitude corresponding to an angular limit,
   c. pulse adding circuit means having a first input for receiving a negative enabling pulse and a negative input for receiving the negative output pulse from said difference amplifier for cancelling said positive enabling pulse when said negative pulse is generated.

2. The high speed gate of claim 1 wherein said first difference amplifier has clipping means for clipping positive input pulses and said second difference amplifier has clipping means for clipping negative input pulses.

3. The high speed gate of claim 1 wherein said difference amplifier means includes:
   a a first difference amplifier including first and second transistors having a base, collector and emitter, b the base of said first transistor being coupled to said input terminal means,
c the collector of said first transistor being connected to a B− voltage supply,
d the emitters of said first and second transistors being connected to a B+ voltage supply,
e the collector of said second transistor being connected through a load resistor to the B− voltage supply and
f a second difference amplifier including third and fouth transistors having a base, collector and emitter,
g the base of said third transistor being connected to said input terminal means,
h the collector of said third transistor being connected through a load resistor to the B+ voltage supply,
i the emitters of said third and fourth transistors being connected to the B− voltage supply,
j the collector of said fourth transistor being connected to the B+ voltage supply,
k the collector of said second transistor being connected through adding resistors to the collector of said third transistor,
l a voltage divider network having a first terminal connected to said B− voltage supply and a second terminal connected to said B+ voltage supply,
m the bases said second and fourth transistors being connected to said voltage divider network for providing negative and positive voltages to the bases of said second and fourth transistors representing, respectively, the lower and upper angle limits.

* * * * *